United States Patent
Jones (10) Patent No.: US 11,093,810 B1
(45) Date of Patent: Aug. 17, 2021

(54) MULTIZONE EQUIPMENT TRACKING SYSTEM AND METHOD

(71) Applicant: T-Mobile USA, Inc., Bellevue, WA (US)

(72) Inventor: Stephen Matthew Jones, Plano, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/851,069

(22) Filed: Apr. 16, 2020

(51) Int. Cl.
*G06K 19/07* (2006.01)
*G06K 19/077* (2006.01)
*G06Q 10/08* (2012.01)
*G06K 7/10* (2006.01)
*H04W 4/029* (2018.01)

(52) U.S. Cl.
CPC ..... *G06K 19/0728* (2013.01); *G06K 7/10099* (2013.01); *G06K 7/10376* (2013.01); *G06K 19/07758* (2013.01); *G06Q 10/087* (2013.01); *H04W 4/029* (2018.02)

(58) Field of Classification Search
CPC .......... G06K 19/0728; G06K 7/10099; G06K 7/10376; G06K 19/07758; H04W 4/029; G06Q 10/087
See application file for complete search history.

(56) References Cited

U.S. PATENT DOCUMENTS

| | | | | |
|---|---|---|---|---|
| 8,258,953 | B2* | 9/2012 | Stern | G06K 7/0008 340/572.1 |
| 8,754,748 | B2* | 6/2014 | Orlassino | G06K 7/10386 340/10.1 |
| 9,875,459 | B2* | 1/2018 | Altamirano | G06K 7/10009 |
| 10,827,302 | B2* | 11/2020 | Keal | H04W 4/025 |
| 2010/0045436 | A1* | 2/2010 | Rinkes | H04Q 9/00 340/10.1 |
| 2010/0067420 | A1* | 3/2010 | Twitchell, Jr. | G06Q 10/08 370/311 |
| 2019/0325173 | A1* | 10/2019 | Tingler | G06K 7/0008 |
| 2019/0337483 | A1* | 11/2019 | Winston | B60R 25/104 |

\* cited by examiner

*Primary Examiner* — Mohamed Barakat
(74) *Attorney, Agent, or Firm* — Barta, Jones & Foley, P.C.

(57) ABSTRACT

A multizone equipment tracking solution includes radio frequency identification (RFID) tags affixed to items of inventoried equipment; a plurality of RFID readers deployed in a plurality of different zones, including a transit zone and a storage zone, wherein an RFID reader in a transit zone comprises a mobile reader; and a monitoring node. The RFID readers read the plurality of tags, for example from items that are in the different zones, and report the tag codes to the monitoring node. Examples permit a real-time, end-to-end view of inventoried equipment across different zones, spanning multiple, widely-dispersed storage locations, in-transit routes (for both installation delivery and decommissioning recovery), and at operational sites. Reported data, including locations, times (e.g., durations), may be advantageously mined to provide value for inventory management by locating misplaced or incorrectly-routed items, and identifying excessive transit and storage times and actual loss events.

18 Claims, 6 Drawing Sheets

MULTIZONE EQUIPMENT TRACKING SYSTEM AND METHOD

BACKGROUND

Inventory control of expensive items, for example cellular tower (cellular base station) communication equipment, is often challenging and may have gaps, due to inconsistent levels of visibility and tracking incompatibilities in different locations. Whereas some individual storage locations may have local inventory control measures in place, when an item leaves a storage location, tracking options while the item is in transit may require a different, incompatible solution. Additionally, when the equipment is installed at an operational site, visibility may be reduced to infrequent episodes, relying on expensive site visits by work crews. Unfortunately, this permits the loss or misplacement of items to remain unresolved for extended periods of time, or resolving with inefficient solutions, driving up inventory costs—for example, by unnecessarily replacing equipment that could be found with a superior equipment tracking capability.

SUMMARY

The following summary is provided to illustrate examples disclosed herein, but is not meant to limit all examples to any particular configuration or sequence of operations.

A multizone equipment tracking solution includes RFID tags affixed to items of inventoried equipment; a plurality of RFID readers deployed in a plurality of different zones, including a transit zone and a storage zone, wherein an RFID reader in a transit zone comprises a mobile reader; and a monitoring node. The RFID readers read the plurality of tags, for example from items that are in the different zones, and report the tag codes to the monitoring node. Examples permit a real-time, end-to-end view of inventoried equipment across different zones, spanning multiple, widely-dispersed storage locations, in-transit routes (for both installation delivery and decommissioning recovery), and at operational sites. Reported data, including locations, times (e.g., durations), may be advantageously mined to provide value for inventory management by locating misplaced or incorrectly-routed items, and identifying excessive transit and storage times and actual loss events.

BRIEF DESCRIPTION OF THE DRAWINGS

The disclosed examples are described below with reference to the accompanying drawing figures listed below, wherein.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

An inventory control system, leveraging radio frequency identification (RFID) inventory control system tags and multiple deployed readers (both fixed and mobile), is able to provide end-to-end item tracking capability, from acceptance into inventory at a national distribution center (NDC), through transit, interim storage at multiple different market staging locations (MSLs), deployment to widely dispersed operational sites, and eventual decommissioning for return to storage. Example items that may be advantageously tracked include antennas, tower equipment, cabling, cabinets, support equipment, and other items needed for cellular tower site operations. Aspects of the disclosure may also be used for different industry segments facing inventory control challenges for widely-dispersed items in multiple different zones (e.g., storage, transit, and operational zones), for example, mining, construction, oil and gas, utilities infrastructure (e.g. water, gas, electric, and cable), manufacturing, and others. Examples remove reliance on human data entry for equipment tracking, throughout the supply chain.

A multizone equipment tracking solution includes RFID tags affixed to items of inventoried equipment; a plurality of RFID readers deployed in a plurality of different zones, including a transit zone and a storage zone, wherein an RFID reader in a transit zone comprises a mobile reader; and a monitoring node. The RFID readers read the plurality of tags, for example from items that are in the different zones, and report the tag codes to the monitoring node. Examples permit a real-time, end-to-end view of inventoried equipment across different zones, spanning multiple, widely-dispersed storage locations, in-transit routes (for both installation delivery and decommissioning recovery), and at operational sites. In some examples, a recovery process includes removing on-site (previously operational) equipment for maintenance or repair—and then either repairing and re-deploying that equipment back to the site (or another site) or decommission the equipment, if repair is too costly. Reported data, including locations, times (e.g., durations), may be advantageously mined to provide valuable inventory management metrics and other data by locating misplaced or incorrectly-routed items, and identifying excessive transit and storage times and actual loss events.

Aspects of the disclosure reduce inventory control costs by rapidly locating misplaced items, so they may be recovered and put into operations, rather than replaced, unnecessarily. Aspects of the disclosure further reduce inventory control costs by rapidly verifying the location of items for which other inventory reporting measures are incompatible, inconsistent, or inaccurate, in order to produce a more accurate accounting of items. Aspects of the disclosure enable improved operational efficiencies, by identifying excessive storage and transit times that may indicate opportunities to adjust inventory levels and also identify underperforming transit carriers. Aspects of the disclosure enable improved loss prevention efforts, by permitting identification of actual theft incidents as opposed to incomplete or inaccurate manual inventory checks.

Multiple zones include an NDC, transit from the NDC to a plurality of MSLs, the MSLs, transit from MSLs to operational sites (e.g., in the possession of another party, such as a contracted construction company that is building an operational site), and the operational sites themselves. Mobile RFID readers may be vehicle-mounted (e.g., truck or trailer) or hand-portable and placed on a pallet for transit with the items being tracked. Some RFID readers may be placed with site inspection systems, such as portable or autonomous inspection systems, or mounted within site support enclosures (e.g., cabinets and sheds). RFID tags may be co-located with optical barcode labels, so that an inventory control sensor may scan either optical barcode label or an RFID tag, if one option is not available or performing sufficiently for a reliable read. Because RFID tags do not require optical visibility for reading, they may be placed underneath barcode stickers for environmental protection. Some mobile RFID readers also include a display that can confirm the items that an RFID reader should accompany, or other instructions, such as that the RFID reader should be recharged and/or returned to a specific location. Some mobile RFID readers also include a wireless signal strength measurement component (e.g., a cellular signal strength measurement component) that measures cellular network signal strength along transit routes, thereby providing additional value.

Figure 1:
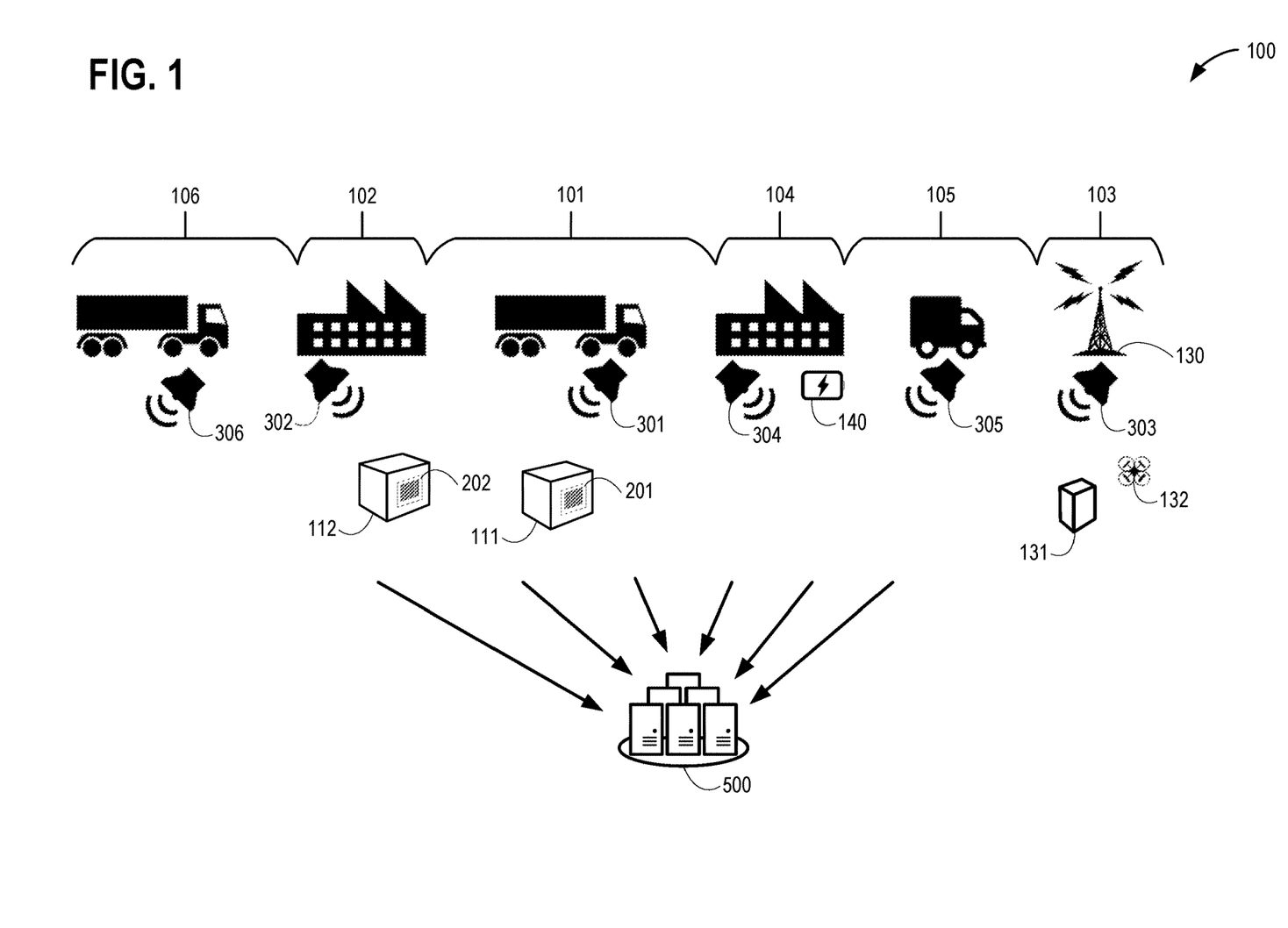
FIG. 1 illustrates an exemplary multizone equipment tracking arrangement.

FIG. 1 illustrates an exemplary multizone equipment tracking arrangement 100 that can advantageously provide multizone equipment tracking. Additional details for components of arrangement 100 are provided in FIGS. 2, 3, 5, and 8, a timeline associated with arrangement 100 is illustrated in FIG. 4, and operations associated with arrangement 100 are illustrated in flow charts of FIGS. 6 and 7. Arrangement 100 includes a plurality of zones 101-106, as indicated. A first zone 101 comprises a transit zone, and shows a first item 111, comprising inventoried equipment, being transported from a second zone 102 toward a third zone 103. Zone 102 comprises a storage zone at an endpoint of zone 101, for example an NDC. Zone 103 comprises an operational zone, for example an operational cellular tower site. A second item 112, also comprising inventoried equipment, is stored in zone 102.

Item 111 may represent, for example, cellular communication equipment such as a transceiver, while item 112 may represent a different item than item 111, such as cabling components. As illustrated, item 112 is in a different zone than item 111, although both may be tracked simultaneously across multiple zones, as described below. Items 111 and 112 are both destined for zone 103, in which item 111 and item 112 are to be employed as operating equipment, for example, to enable a tower 130 in zone 103 to function as a cellular tower in a cellular network. Although only a single manifestation of zone 103 is illustrated, it should be understood that the zones represent different classes of locations and that multiple different physical locations may exist in a particular zone. In some examples, zone 3 represents cellular tower site, a dam, a factory, a refinery, a chemical plant, or another construction or operations site.

Zone 101 comprises at least a portion of a transit route from zone 102 to zone 103. The illustrated transit route also includes a fourth zone 104 that comprises a storage zone (e.g., an MSL) at an endpoint of zone 101 opposite zone 102, and a fifth zone 105 that also comprises a transit zone. In some examples, zone 105 is a site developer zone and represents the possession of item 111 and or item 112 by another entity, such as a general contractor, that had been hired to build, maintain, or otherwise develop a site, such as constructing tower 130 in zone 3. Zone 103 and zone 104 are at opposite endpoints of zone 105. It should be understood that transit routes may have a different number of segments and different configurations.

Figure 2:
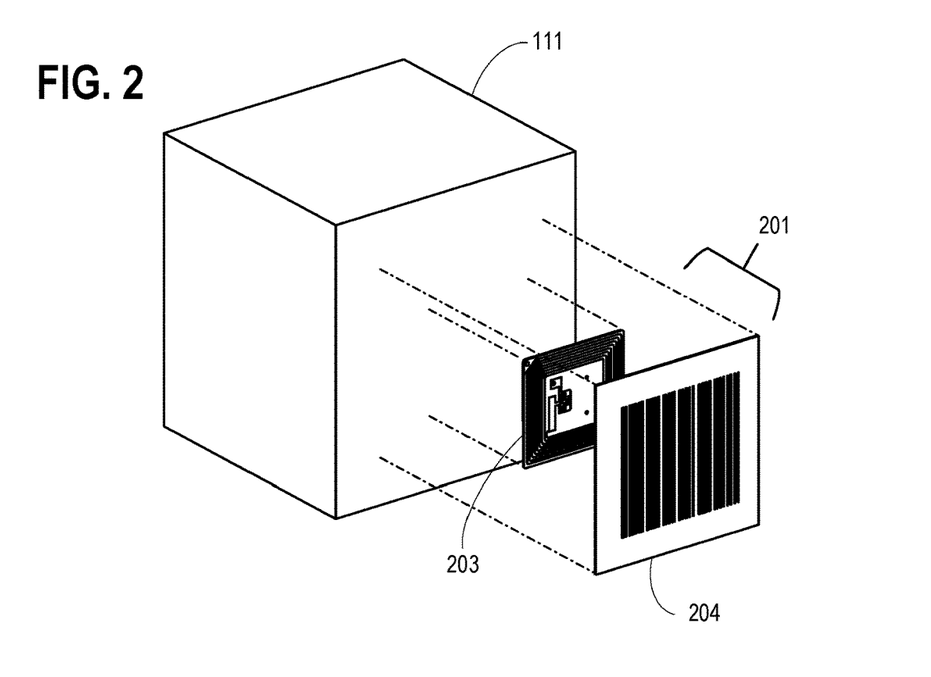
FIG. 2 illustrates additional detail for components of the arrangement of FIG. 1.

When new products arrive from a supplier, for example items 111 and 112 arriving at zone 102 from a sixth zone 106, barcode-RFID stickers are placed on the products used for inventory tracking. For example, a first RFID tag 201 is configured to be affixed to item 111 and a second RFID tag 202 is configured to be affixed to item 112. RFID tag 201 is shown in more detail in FIG. 2, and in some examples, RFID tag 202 is similar to RFID tag 202 except for the codes being unique to each tag. Turning briefly to FIG. 2, RFID tag 201 is shown as comprising electrical components 203 and an optical barcode label 204. RFID tag 201 is configured to be affixed to item 111 so that optical barcode label 204 provides environmental protection for electrical components 203 of RFID tag 201 when RFID tag 201 is affixed to item 111. Optical barcode label 204 provides a back-up or alternative way to track item 111 if, for example, an RFID tag code that is encoded into electrical components 203 cannot be read. Similarly, in some examples, RFID tag 202 is configured to be affixed to item 112 so that an optical barcode label provides environmental protection for electrical components of RFID tag 202. In some examples, RFID tag 201 does not include optical barcode label 204.

Returning to FIG. 1, a plurality of RFID readers 301-306 are shown, one in each of zones 101-106. It should be understood, however, that a larger number if RFID readers may be employed in each of zones 101-106, and the illustrated RFID readers 301-306 are merely exemplary. As illustrated, a first RFID reader 301 is deployed in zone 101; a second RFID reader 302 is deployed in zone 102; a third RFID reader 303 is deployed in zone 103; a fourth RFID reader 304 is deployed in zone 104; a fifth RFID reader 305 is deployed in zone 105; and a sixth RFID reader 306 is deployed in zone 106. RFID readers 301-306 are each configured to read both a first RFID tag code from RFID tag 201 and a second RFID tag code from RFID tag 202 when each of RFID tag 201 and RFID tag 202 comes within range (e.g., is in close proximity within the same zone as the RFID reader itself). Each of RFID readers 301-306 is configured to report RFID tag codes that they read to a monitoring node 500. RFID readers 301-306 are shown in further detail in FIG. 3, and monitoring node 500 is shown in further detail in FIG. 5.

Because zone 101 is a transit zone, in some examples, RFID reader 301 comprises a mobile reader. Additionally, in some examples, at least RFID reader 305 and RFID reader 306 each comprises a mobile reader. In some examples, RFID reader 303 is disposed within site support structure 131 that houses items 111 and 112. Site support structure 131 may be a site support cabinet or a site support shed. In some examples, RFID reader 303 comprises a component of an autonomous inspection system 132 that performs inspections of tower 130 and site support structure 131.

Figure 3:
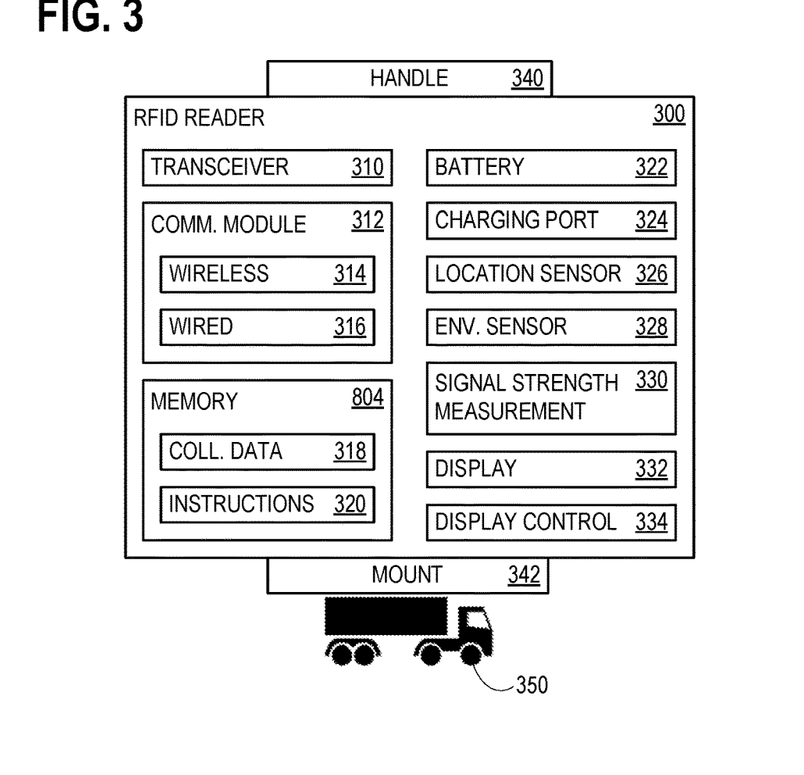
FIG. 3 also illustrates additional detail for components of the arrangement of FIG. 1.
Figure 4:
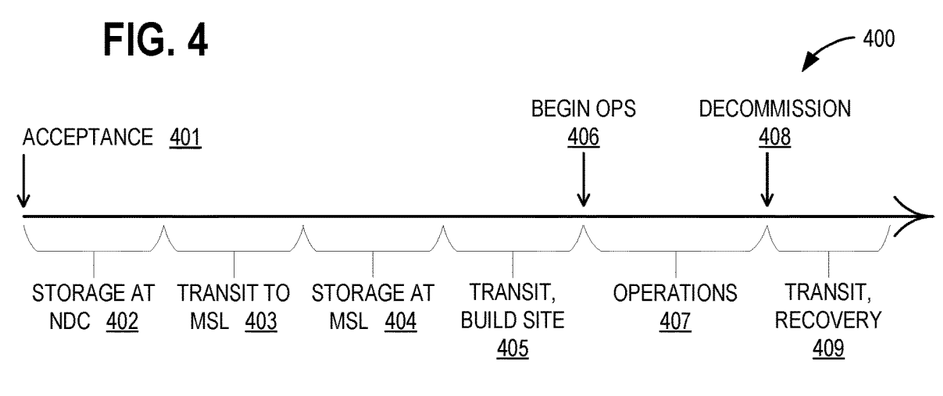
FIG. 4 illustrates a timeline of exemplary activities associated with the arrangement of FIG. 1.

Turning briefly to FIG. 3, a representative RFID reader 300 is shown. RFID reader 300 represents any of RFID readers 301-306. Any of RFID readers 301-306 may have some or all of the components shown for RFID reader 300. In some examples, various components of RFID reader 300 are implemented using at least a portion of one or more computing devices 800 of FIG. 8. RFID reader 300 comprises a transceiver 310 for reading RFID tags (e.g., reading RFID tag codes from RFID tag 201 and RFID tag 202), and a communication module 312 that is configured to report RFID tag codes to monitoring node 500. That is, a communication module (e.g., communication module 312) in each of RFID readers 301-306 is configured to report both the first RFID tag code and the second RFID tag code to monitoring node 500.

In some examples, mobile versions of RFID reader 300 (e.g., RFID readers 301 and 305) will make reports wirelessly. Thus, some examples of communication module 312 will include a wireless communication module 314. A battery 322 provides power for mobile versions of RFID reader 300, and is recharged via a charging port 324, which may be wired or wireless. In some examples, RFID reader 300 comprises a hand-portable RFID reader, and a handle 340 permits lifting and placement of RFID reader 300 on a pallet along with item 111 or item 112. In some examples, RFID reader 300 comprises a vehicle-mounted RFID reader. For RFID readers that are mounted in place, for example mounted to a vehicle 350, site support structure 131, or autonomous inspection system 132, with a mount 342, communication module 312 may include a wired communication module 316. In some examples, RFID reader 300 is wired to vehicle 350, site support structure 131, or autonomous inspection system 132, and vehicle 350, site support structure 131, or autonomous inspection system 132 has a transponder to report data to monitoring node 500.

Mobile versions of RFID reader 300 (e.g., RFID readers 301 and 305) may also include a location sensor 326 configured to determine a location of RFID reader 300. Location sensor 326 may include a Global Positioning System (GPS) receiver, inertial sensors, and/or a compass. In some examples, location sensor 326 identifies the serving cellular tower and references the identity of that cellular tower as its location (which may be actually determined, externally, using a database of cellular tower locations). RFID tags that are read may thus have their positions reported as the position determined for RFID reader 300. Thus, for example, communication module 312 within each of RFID readers 301 and 305 comprises wireless communication module 314 configured to wirelessly report both the transit location of RFID tag 201 and the transit location of RFID tag 202 to monitoring node 500.

Having a mobile version of RFID reader 300 accompany items 111 and 112 during transit presents some opportunities for collecting additional information. A mobile version of RFID reader 300 may also comprise an environmental sensor 328 selected from the list consisting of: a temperature sensor, a humidity sensor, and a shock sensor. For example, RFID reader 301 is configured to report an environmental condition measurement to monitoring node 500. This permits monitoring for conditions during transit that may damage items 111 or 112. A mobile version of RFID reader 300 may also comprise an environmental sensor 328 selected from the list consisting of: a temperature sensor, a humidity sensor, and a shock sensor. For example, RFID reader 301 is configured to report an environmental condition measurement to monitoring node 500. This permits monitoring for conditions during transit that may damage items 111 or 112.

A mobile version of RFID reader 300 may also comprise a wireless signal strength measurement component 330 for measuring a wireless signal strength along a transit route in zone 101 (or in any other zone). In such examples, RFID reader 300 is configured to report a wireless signal strength measurement to monitoring node 500. In some examples, wireless signal strength measurement component 330 comprises a cellular signal strength measurement component, and so measuring a wireless signal strength comprises measuring a cellular signal strength. This permits network coverage analysis in specific locations (e.g., routes within zone 101), while reducing the need to schedule dedicated crews to measure cellular signal strength along that route.

The various measurements (e.g., RFID tag codes, location, signal strength, environmental conditions), along with time and battery condition are stored in collected data 318 in memory 804, for later reporting to monitoring node via communication module 312.

In some examples, RFID reader 300 comprises a display 332 for displaying transport instructions 320 for RFID reader 300 under the control of a display controller 334. Transport instructions 320 are stored in memory 804 and may include, for example, an instruction to transport RFID reader 300 with item 111 and an instruction to return RFID reader 300 to a particular location. For example, RFID reader 301, which operates in zone 101 with endpoints at zones 102 and 104, may include display 332 and displaying transport instructions 320. In such examples, transport instructions 320 include an instruction to transport RFID reader 301 with item 111 and an instruction to return RFID reader 301 to zone 102. If, upon arrival at zone 104, battery 322 of RFID reader 301 is low, display controller 334 may retrieve an instruction (from transport instructions 320) for a user to recharge RFID reader 301 and display that instruction on display 332. In some examples, a charging station 140 in zone 104 is configured to recharge RFID reader 301 (a mobile version of RFID reader 300).

FIG. 4 illustrates a timeline 400 of exemplary activities associated with multizone equipment tracking, and is explained in relation to item 111. An acceptance event 401 brings item 111 into inventory, and RFID tag 201 is affixed. Time period 402 is the duration of storage in zone 102 (e.g., an NDC), and RFID reader 302 detects the presence of item 111 (via reading RFID tag 201). At some point, item 111 is shipped to zone 4 (e.g., an MSL) via transit zone 101, and RFID reader 301 accompanies item 111. Time period 402 is the duration of transport through zone 101. RFID reader 301 and/or RFID reader 304 detect the offloading of item 111 from the transport vehicle (e.g., vehicle 350) when item 111 moves into zone 104. Time period 404 is the duration of storage in zone 104. RFID reader 304 detects the presence of item 111 while item 111 is within zone 104.

When the site developer collects item 111 from zone 104, moving item 111 into zone 105, RFID reader 305 detects the presence of item 111. Time period 405 is the duration that item 111 spends within zone 105 (e.g., with the site developer), between the site developer collecting item 111 from zone 104 and the beginning of operations 406 at zone 103. Time period 407 is the duration in operations in zone 103. Although item 111 does not physically move from the site, the RFID reader tracking it changes from RFID reader 305 to RFID reader 303. This change of zones is thus a result of a change in inventory management responsibilities, from the site developer to site maintenance team. At the end of operations, a decommissioning event 408 terminates time period 407. Decommissioned equipment, for example item 111 when it reaches the end of its original deployment, may be returned to zone 102, zone 104, or some other location, and can be tracked by RFID readers that are deployed along the recovery route. Time period 409 is the duration of recovery transit during decommissioning, until item 111 reaches its destination and is further addressed by inventory management actions. At the completion of time period 409, the equipment will be either repaired and re-deployed, or decommissioned.

Figure 5:
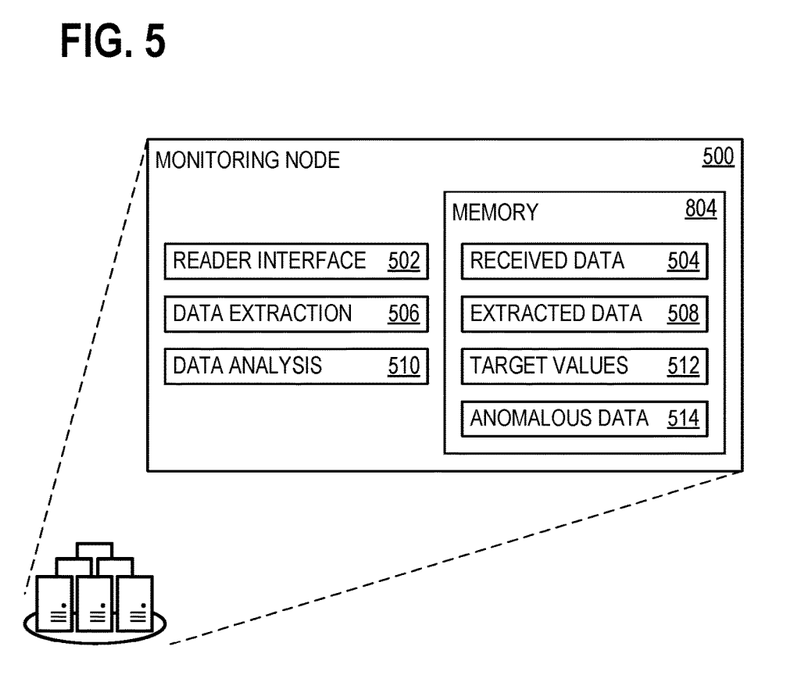
FIG. 5 also illustrates additional detail for a component of the arrangement of FIG. 1.

FIG. 5 illustrates additional detail for monitoring node 500. In some examples, monitoring node 500 is implemented using at least a portion of one or more computing devices 800 of FIG. 8. In some examples, monitoring node 500 is provided as a cloud service. A reader interface 502 receives data and measurements from RFID readers 301-305, and in some examples, RFID reader 306. Reader interface 502 stores data and measurements received from RFID readers 301-306 in received data 504 in memory 804.

A data extraction component 506 is configured to extract storage duration data and transit duration data (e.g., time periods 402-405, 407, and 409) from received data 504, as extracted data 508. For example, data extraction component 506 is configured to extract storage duration data and transit duration data for both item 111 and item 112, from zone 102 through zone 103, inclusive, based at least on reports regarding the code from RFID tag 201 and the code from RFID tag 202 received by monitoring node 500. In some examples, data extraction component 506 is further configured to extract location data, wireless signal strength measurements, environmental condition measurements. In some examples, data extraction component 506 is further configured to extract transit duration data and transit location data, for both item 111 and item 112, after cessation of operations at zone 103, based at least on reports regarding the code from RFID tag 201 and the code from RFID tag 202 received by monitoring node 500.

A data analysis component 510 is configured to identify anomalous values in extracted data 508 by comparing extracted data 508 with target values 512 that identify desired bounds for storage and transit times, environmental conditions, and wireless network performance. For example excessive transit or storage times may be indicated as anomalous data 514, based upon values found within time periods 402-405, 407, and 409. A data analysis component 510 is configured to identify anomalous values indicated by the extracted storage duration data and the extracted transit duration data. Anomalous data 514 may also include anomalous environmental conditions, such as excessive temperatures, humidity, and shock may also be identified. Thus, the anomalous values comprise at least one value selected from the list consisting of: an excessive storage duration, an excessive transit duration, an improperly-routed transit, a misplaced item, and a missing item. Anomalous data 514 may be used to locate misplaced equipment, identify equipment loss events (whether mistakenly-routed or theft), and provide insight into equipment usage (e.g., how long after delivery to one location, such as the site construction contractor, the equipment is moved or installed at a site).

Figure 6:
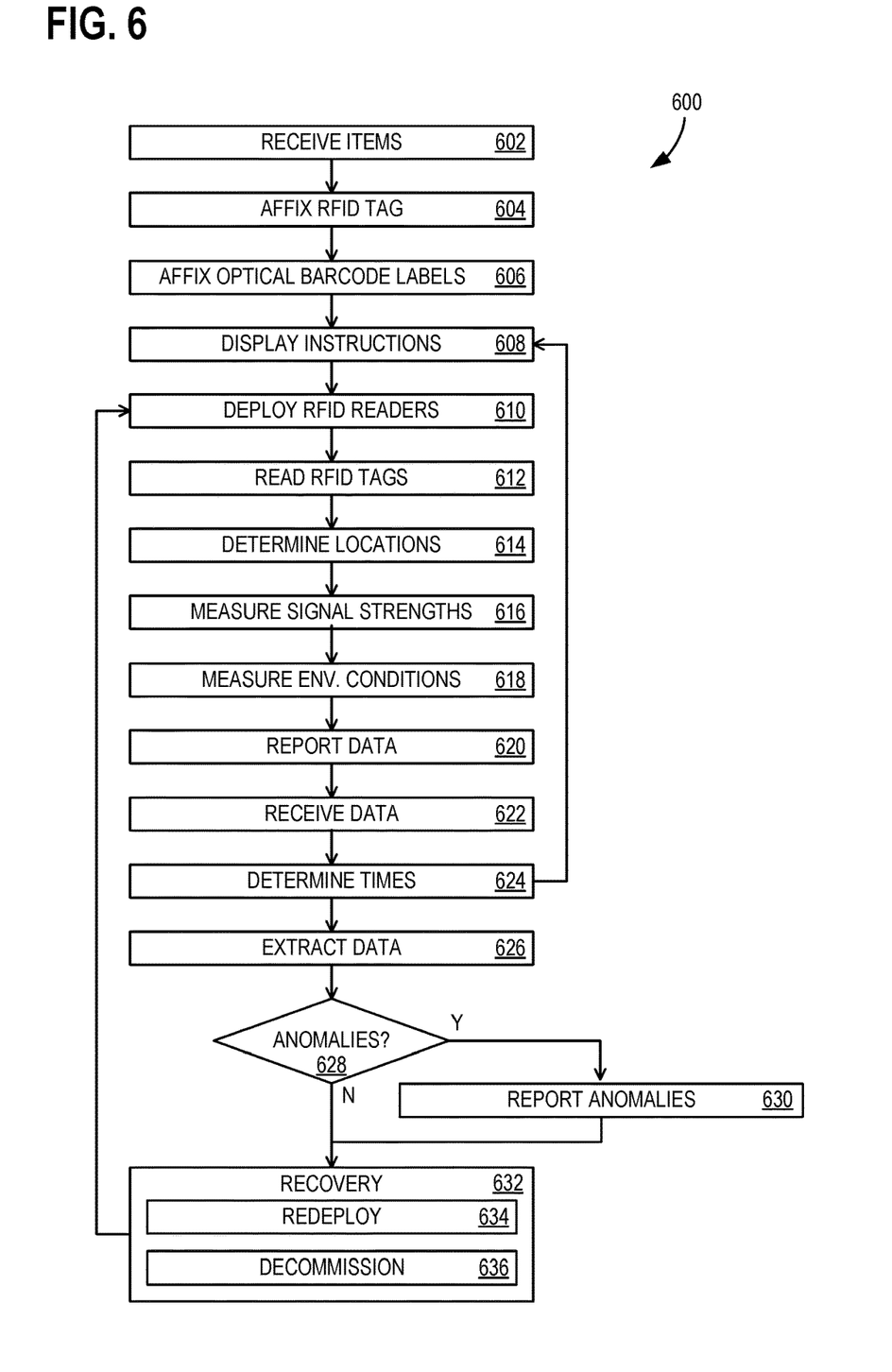
FIG. 6 illustrates a flow chart of exemplary operations associated with the arrangement of FIG. 1.

FIG. 6 illustrates a flow chart 600 of a method of multizone equipment tracking. In some examples, at least a portion of flow chart 600 may be performed using one or more computing devices 800 of FIG. 8. Items are received at 602 and RFID tags are affixed in operation 604. In some examples, operation 604 includes affixing a first RFID tag to a first item, the first item comprising inventoried equipment; and affixing a second RFID tag configured to a second item, the second item different than the first item, the second item comprising inventoried equipment. RFID tags may be co-located with optical barcode labels, so that an inventory control sensor can scan either optically or with RFID. Because RFID tags do not require optical visibility, they may be placed underneath optical barcode labels for environmental protection. Thus, operation 606 includes affixing optical barcode labels, if the optical barcode labels were not already included as part of the RFID tags.

Operation 608 includes displaying instructions for a user on the first RFID reader, transport instructions for the first RFID reader, for example displaying, on the first RFID reader, transport instructions for the first RFID reader. For some instances of operation 608, the transport instructions may be instructions to ship the first RFID reader with the first item. For some instances of operation 608, the transport instructions may be instructions to return the first RFID reader to the second zone. For some instances of operation 608, instructions may be displayed to recharge the first RFID reader. Operation 608 recurs as needed, for example upon an RFID reader reaching the end of a transit route (e.g., after operation 624).

RFID readers are deployed in operation 610, for example by installation in warehouses (e.g. zone 102 NDC, zone 104 MSLs), trucks and/or trailers (e.g., vehicle 350) and at operational sites (e.g., zone 3). In some examples, deploying an RFID reader is placing it on a pallet with equipment to be shipped, and ensuring that it is powered on and registered with a network in order to report data. In various examples, operation 610 includes deploying a first RFID reader in a first zone, wherein the first RFID reader comprises a first communication module and a mobile reader, and wherein the first zone comprises a transit zone; deploying a second RFID reader in a second zone, wherein the second RFID reader comprises a second communication module, and wherein the second zone comprises a storage zone at an endpoint of the first zone; deploying a third RFID reader in a third zone, wherein the third RFID reader comprises a third communication module, wherein the third zone comprises an operational zone in which the first item and the second item are employed as operating equipment, and wherein the first zone comprises at least a portion of a transit route from the second zone to the third zone; deploying a fourth RFID reader in a fourth zone, wherein the fourth RFID reader comprises a fourth communication module, and wherein the fourth zone comprises a storage zone at an endpoint of the first zone opposite the second zone; and deploying a fifth RFID reader in a fifth zone, wherein the fifth RFID reader comprises a fifth communication module zone, wherein the fifth zone comprises a transit zone, and wherein the third zone and the fourth zones are at opposite endpoints of the fifth zone. Operation 610 recurs as needed.

RFID tags are read in operation 610, for example on a periodic schedule (e.g., hourly or more or less often), or upon some trigger event (e.g., a manual trigger by a human user, or a location-based trigger such as arrival at or departure from some location). In various examples, operation 612 includes reading, by the first RFID reader, both a first RFID tag code from the first RFID tag and a second RFID tag code from the second RFID tag; reading, by the second RFID reader, both the first RFID tag code and the second RFID tag code; reading, by the third RFID reader, both the first RFID tag code from the first RFID tag and the second RFID tag code from the second RFID tag; reading, by the fourth RFID reader, both the first RFID tag code from the first RFID tag and the second RFID tag code from the second RFID tag; and reading, by the fifth RFID reader, both the first RFID tag code from the first RFID tag and the second RFID tag code from the second RFID tag.

Mobile RFID readers determine their locations in operation 614, for example on a periodic schedule (e.g., hourly or more or less often), or upon some trigger event (e.g., a manual trigger by a human user, or a location-based trigger such as arrival at or departure from some location). In various examples, operation 614 includes determining a location of the first RFID reader and determining a location of the fifth RFID reader. Some mobile RFID readers perform additional measurements. For example, operation 616 includes measuring a wireless signal strength along a transit route in the first zone. In some examples, measuring a wireless signal strength comprises measuring a cellular signal strength. Operation 618 includes measuring an environmental condition.

Measured data and RFID tag codes are reported in operation 620, for example on a periodic schedule (e.g., hourly or more or less often), or upon some trigger event (e.g., competing a measurement or reading event, a manual trigger by a human user, or a location-based trigger such as arrival at or departure from some location). In various examples, operation 620 includes reporting, by the first communication module, both the first RFID tag code and the second RFID tag code to the monitoring node; reporting, by the second communication module, both the first RFID tag code and the second RFID tag code to the monitoring node; reporting, by the third communication module, both the first RFID tag code and the second RFID tag code to the monitoring node; reporting, by the fourth communication module, both the first RFID tag code and the second RFID tag code to the monitoring node; and reporting, by the fifth communication module, both the first RFID tag code and the second RFID tag code to the monitoring node. In some examples, operation 620 further includes wirelessly reporting, by the first communication module, both the transit location of the first RFID tag and the transit location of the second RFID tag code to the monitoring node; wirelessly reporting, by the fifth communication module, both the transit location of the first RFID tag and the transit location of the second RFID tag code to the monitoring node; reporting the wireless signal strength measurement to the monitoring node; and reporting the environmental condition measurement to the monitoring node.

Reported data is received by the monitoring node at 622, and times (including timestamps and time durations, as needed) are determined in operation 624 using the monitoring node's internal clock, if the time information was not included in the reported data. For example an arrival time may be determined in operation 624, based on data received in operation 622 from an RFID reader in the fourth zone, regarding an item which had been previously detected by an RFID reader in the third zone. This enables determination of the transit time through the third zone and triggers a redeployment message on the third RFID reader (going back to operation 608).

Operation 626 includes extracting storage duration data and transit duration data, for both the first item and the second item, based at least on reports regarding the first RFID tag code and the second RFID tag code received by the monitoring node. Operation 628 includes identifying anomalous values indicated by the extracted storage duration data and the extracted transit duration data. Identified anomalies (if any) are reported in operation 630, to permit redial operation and realization of value from the disclosure. During item recovery, operation 632 includes extracting transit duration data and transit location data, for both the first item and the second item, after cessation of operations at the third zone, based at least on reports regarding the first RFID tag code and the second RFID tag code received by the monitoring node. In some examples, operation 632 includes either operation 634 for repairing and re-deploying that equipment back to the site (or another site) or operation 636 for decommission the equipment, based upon a decision whether repair is too costly.

Figure 7:
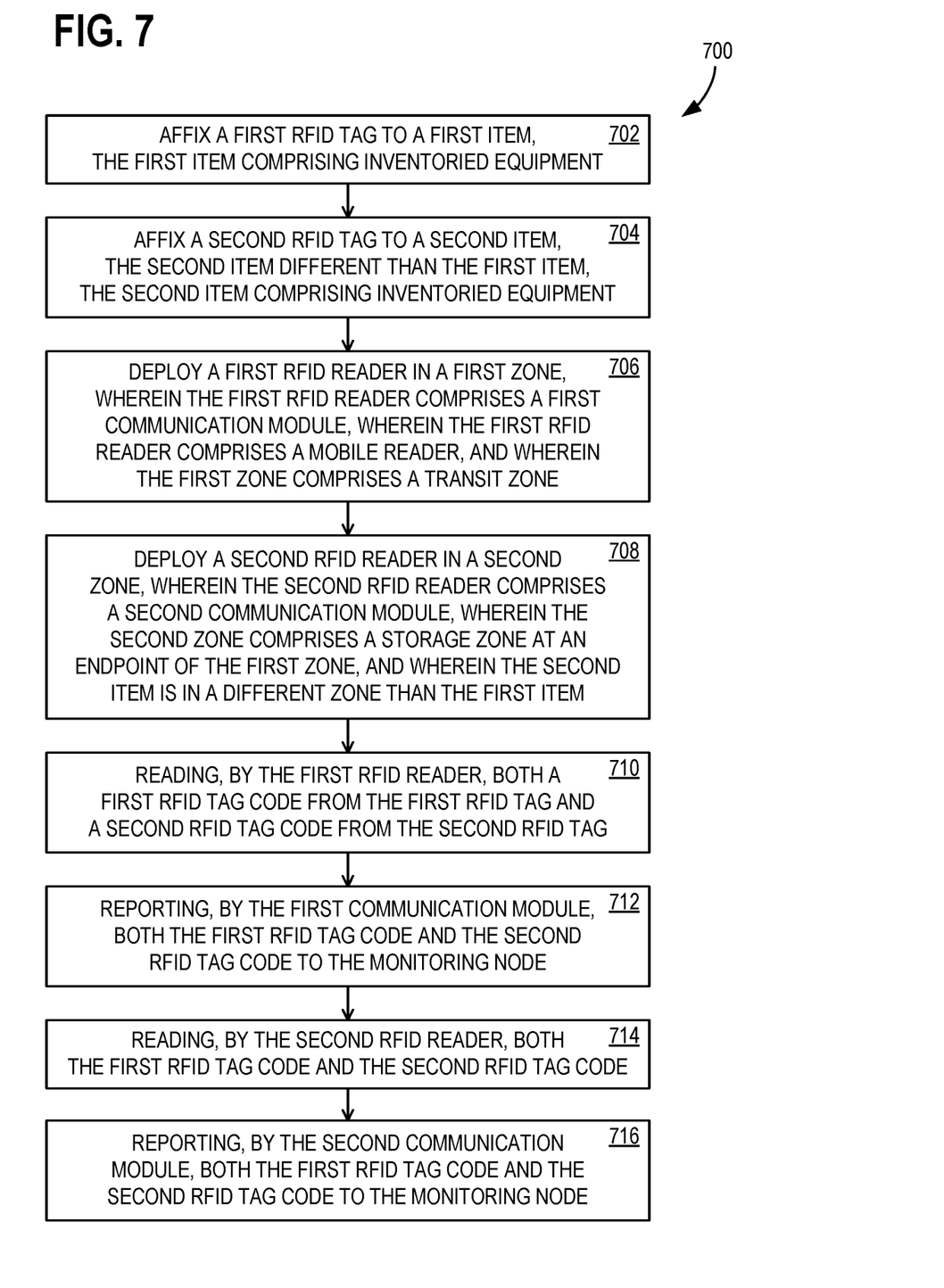
FIG. 7 illustrates another flow chart of exemplary operations associated with the arrangement of FIG. 1.

FIG. 7 illustrates a flow chart 700 of a method of multizone equipment tracking. In some examples, at least a portion of flow chart 700 may be performed using one or more computing devices 800 of FIG. 8. Operation 702 includes affixing a first radio frequency identification (RFID) tag to a first item, the first item comprising inventoried equipment. Operation 704 includes affixing a second RFID tag configured to a second item, the second item different than the first item, the second item comprising inventoried equipment. Operation 706 includes deploying a first RFID reader in a first zone, wherein the first RFID reader comprises a first communication module, wherein the first RFID reader comprises a mobile reader, and wherein the first zone comprises a transit zone. Operation 708 includes deploying a second RFID reader in a second zone, wherein the second RFID reader comprises a second communication module, wherein the second zone comprises a storage zone at an endpoint of the first zone, and wherein the second item is in a different zone than the first item. Operation 710 includes reading, by the first RFID reader, both a first RFID tag code from the first RFID tag and a second RFID tag code from the second RFID tag. Operation 712 includes reporting, by the first communication module, both the first RFID tag code and the second RFID tag code to the monitoring node. Operation 714 includes reading, by the second RFID reader, both the first RFID tag code and the second RFID tag code. Operation 716 includes reporting, by the second communication module, both the first RFID tag code and the second RFID tag code to the monitoring node. In some examples, the first communication module further comprises a wireless communication module configured to wirelessly report both a transit location of the first RFID tag and a transit location of the second RFID tag to the monitoring node.

Figure 8:
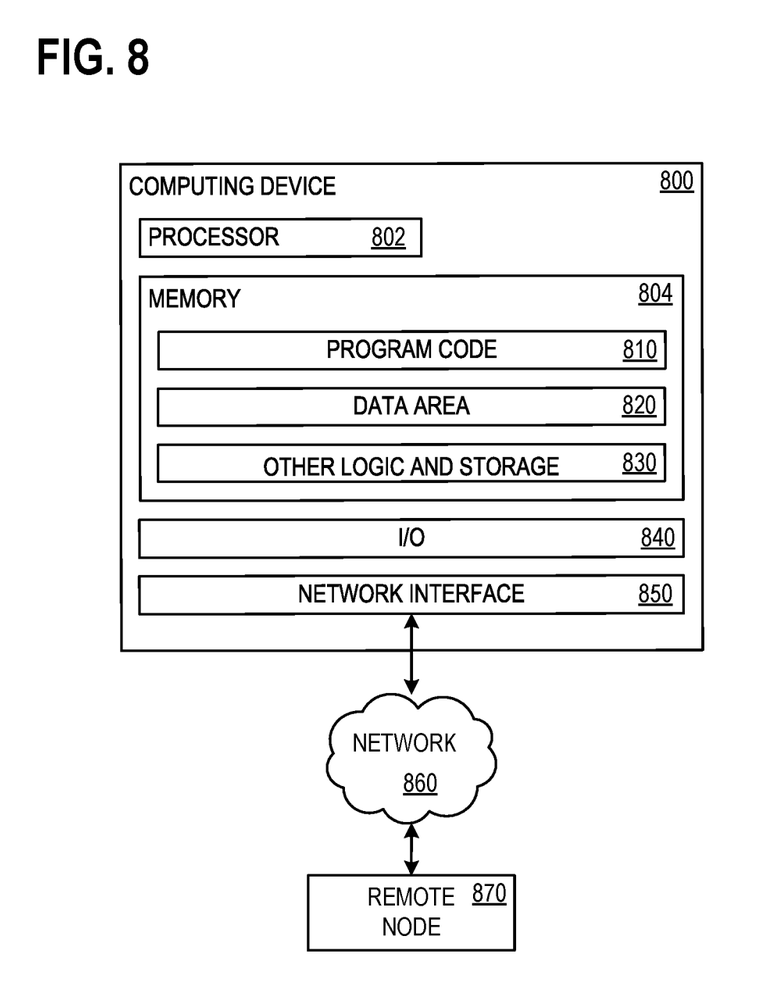
FIG. 8 illustrates a block diagram of a computing device that may be used as a component of the arrangement illustrated in FIG. 1.

FIG. 8 illustrates a block diagram of computing device 800 that may be used within arrangement 100 of FIG. 1, for example as a portion of monitoring node 500 and/or any of RFID readers 301-306. Computing device 800 has at least a processor 802 and a memory 804 that holds program code 810, data area 820, and other logic and storage 830. Memory 804 is any device allowing information, such as computer executable instructions and/or other data, to be stored and retrieved. For example, memory 804 may include one or more random access memory (RAM) modules, flash memory modules, hard disks, solid-state disks, NVMe devices, Persistent Memory devices, and/or optical disks. Program code 810 comprises computer executable instructions and computer executable components including any instructions necessary to perform operations described herein. Data area 820 holds any data necessary to perform operations described herein. Memory 804 also includes other logic and storage 830 that performs or facilitates other functions disclosed herein or otherwise required of computing device 800. An input/output (I/O) component 840 facilitates receiving input from users and other devices and generating displays for users and outputs for other devices. A network interface 850 permits communication over a network 860 with a remote node 870, which may represent another implementation of computing device 800. For example, remote node 870 may represent any of monitoring node 500 and/or any of RFID readers 301-306.

Additional Examples

An exemplary multizone equipment tracking system comprises: a first RFID tag configured to be affixed to a first item, the first item comprising inventoried equipment; a second RFID tag configured to be affixed to a second item, the second item different than the first item, the second item comprising inventoried equipment; a first RFID reader comprising a first communication module and deployed in a first zone, wherein the first RFID reader comprises a mobile reader and wherein the first zone comprises a transit zone; a second RFID reader comprising a second communication module and deployed in a second zone, wherein the second zone comprises a storage zone at an endpoint of the first zone, and wherein the second item is in a different zone than the first item; and a monitoring node; wherein both the first RFID reader and the second RFID reader are configured to read both a first RFID tag code from the first RFID tag and a second RFID tag code from the second RFID tag; and wherein both the first communication module and the second communication module are configured to report both the first RFID tag code and the second RFID tag code to the monitoring node.

An example method of multizone equipment tracking comprises: affixing a first RFID tag to a first item, the first item comprising inventoried equipment; affixing a second RFID tag to a second item, the second item different than the first item, the second item comprising inventoried equipment; deploying a first RFID reader in a first zone, wherein the first RFID reader comprises a first communication module, wherein the first RFID reader comprises a mobile reader, and wherein the first zone comprises a transit zone; deploying a second RFID reader in a second zone, wherein the second RFID reader comprises a second communication module, wherein the second zone comprises a storage zone at an endpoint of the first zone, and wherein the second item is in a different zone than the first item; reading, by the first RFID reader, both a first RFID tag code from the first RFID tag and a second RFID tag code from the second RFID tag; reporting, by the first communication module, both the first RFID tag code and the second RFID tag code to the monitoring node; reading, by the second RFID reader, both the first RFID tag code and the second RFID tag code; and reporting, by the second communication module, both the first RFID tag code and the second RFID tag code to the monitoring node.

Another exemplary multizone equipment tracking system comprises: a first RFID tag configured to be affixed to a first item, the first item comprising inventoried equipment; a second RFID tag configured to be affixed to a second item, the second item different than the first item, the second item comprising inventoried equipment; a first RFID reader comprising a first communication module and deployed in a first zone, wherein the first RFID reader comprises a mobile reader, wherein the first RFID reader further comprises a location sensor configured to determine a location of the first RFID reader, and wherein the first zone comprises a transit zone; a second RFID reader comprising a second communication module and deployed in a second zone, wherein the second zone comprises a storage zone at an endpoint of the first zone, and wherein the second item is in a different zone than the first item; a third RFID reader comprising a third communication module and deployed in a third zone, wherein the third zone comprises an operational zone in which the first item and the second item are employed as operating equipment, and wherein the first zone comprises at least a portion of a transit route from the second zone to the third zone; a monitoring node; a data extraction component; and a data analysis component; wherein the first RFID reader, the second RFID reader, and the third RFID reader are each configured to read both a first RFID tag code from the first RFID tag and a second RFID tag code from the second RFID tag; and wherein each of the first communication module, the second communication module, and the third communication module is configured to report both the first RFID tag code and the second RFID tag code to the monitoring node; wherein the first communication module further comprises a wireless communication module configured to wirelessly report both the transit location of the first RFID tag and the transit location of the second RFID tag to the monitoring node; wherein the data extraction component is configured to extract storage duration data and transit duration data, for both the first item and the second item, from the second zone through the third zone, inclusive, based at least on reports regarding the first RFID tag code and the second RFID tag code received by the monitoring node; and wherein the data analysis component is configured to identify anomalous values indicated by the extracted storage duration data and the extracted transit duration data, the anomalous values comprising at least one value selected from the list consisting of: an excessive storage duration, an excessive transit duration, an improperly-routed transit, a misplaced item, and a missing item.

Alternatively, or in addition to the other examples described herein, examples include any combination of the following:
  the first RFID tag comprises an optical barcode label;
  the optical barcode label provides environmental protection for electrical components of the first RFID tag when the first RFID tag is affixed to the first item;
  affixing an optical barcode label to the first item such that the optical barcode label provides environmental protection for electrical components of the first RFID tag.
  the first RFID reader further comprises a location sensor configured to determine a location of the first RFID reader;
  determining a location of the first RFID reader;
  the first communication module comprises a wireless communication module configured to wirelessly report both the transit location of the first RFID tag and the transit location of the second RFID tag to the monitoring node;
  wirelessly reporting, by the first communication module, both the transit location of the first RFID tag and the transit location of the second RFID tag to the monitoring node;
  the first RFID reader comprises a vehicle-mounted RFID reader;
  the first RFID reader comprises a hand-portable RFID reader;
  the first RFID reader comprises a display for displaying transport instructions for the first RFID reader;
  displaying, on the first RFID reader, transport instructions for the first RFID reader;
  transport instructions include an instruction to transport the first RFID reader with the first item and an instruction to return the first RFID reader to the second zone;
  the first RFID reader comprises a wireless signal strength measurement component;
  the wireless signal strength measurement component comprises a cellular signal strength measurement component;
  measuring a wireless signal strength along a transit route;
  measuring a wireless signal strength comprises measuring a cellular signal strength;
  the first RFID reader is configured to report a wireless signal strength measurement to the monitoring node;
  reporting the wireless signal strength measurement to the monitoring node;

the first RFID reader comprises an environmental sensor selected from the list consisting of: a temperature sensor, a humidity sensor, and a shock sensor;
measuring an environmental condition;
the first RFID reader is configured to report an environmental condition measurement to the monitoring node;
reporting the environmental condition measurement to the monitoring node;
deploying a third RFID reader in a third zone;
a third RFID reader is deployed in a third zone;
the third zone comprises an operational zone in which the first item and the second item are employed as operating equipment;
the first zone comprises at least a portion of a transit route from the second zone to the third zone;
the third RFID reader is configured to read both the first RFID tag code from the first RFID tag and the second RFID tag code from the second RFID tag;
reading, by the third RFID reader, both the first RFID tag code from the first RFID tag and the second RFID tag code from the second RFID tag;
the third RFID reader comprises a third communication module;
the third communication module is configured to report both the first RFID tag code and the second RFID tag code to the monitoring node;
reporting, by the third communication module, both the first RFID tag code and the second RFID tag code to the monitoring node;
the third RFID reader comprises a component of an autonomous inspection system;
the third RFID reader is disposed within a site support structure; (site support cabinet or site support shed)
deploying a fourth RFID reader in a fourth zone;
a fourth RFID reader is deployed in a fourth zone;
the fourth zone comprises a storage zone at an endpoint of the first zone opposite the second zone;
the fourth RFID reader is configured to read both the first RFID tag code from the first RFID tag and the second RFID tag code from the second RFID tag;
reading, by the fourth RFID reader, both the first RFID tag code from the first RFID tag and the second RFID tag code from the second RFID tag;
the fourth RFID reader comprises a fourth communication module;
the fourth communication module is configured to report both the first RFID tag code and the second RFID tag code to the monitoring node;
reporting, by the fourth communication module, both the first RFID tag code and the second RFID tag code to the monitoring node;
a charging station in the fourth zone configured to recharge the first RFID reader;
deploying a fifth RFID reader in a fifth zone;
a fifth RFID reader is deployed in a fifth zone;
the fifth zone comprises a transit zone;
the third zone and the fourth zones are at opposite endpoints of the fifth zone;
the fifth RFID reader is configured to read both the first RFID tag code from the first RFID tag and the second RFID tag code from the second RFID tag;
reading, by the fifth RFID reader, both the first RFID tag code from the first RFID tag and the second RFID tag code from the second RFID tag;
the fifth RFID reader comprises a fifth communication module;
the fifth communication module is configured to report both the first RFID tag code and the second RFID tag code to the monitoring node;
reporting, by the fifth communication module, both the first RFID tag code and the second RFID tag code to the monitoring node.
the fifth RFID reader further comprises a location sensor configured to determine a location of the fifth RFID reader;
determining a location of the fifth RFID reader;
the fifth communication module comprises a wireless communication module configured to wirelessly report both the transit location of the first RFID tag and the transit location of the second RFID tag to the monitoring node;
wirelessly reporting, by the fifth communication module, both the transit location of the first RFID tag and the transit location of the second RFID tag to the monitoring node;
a data extraction component configured to extract storage duration data and transit duration data, for both the first item and the second item, from the second zone through the third zone, inclusive, based at least on reports regarding the first RFID tag code and the second RFID tag code received by the monitoring node;
extracting storage duration data and transit duration data, for both the first item and the second item, based at least on reports regarding the first RFID tag code and the second RFID tag code received by the monitoring node;
the data extraction component is further configured to extract transit duration data and transit location data, for both the first item and the second item, after cessation of operations at the third zone, based at least on reports regarding the first RFID tag code and the second RFID tag code received by the monitoring node;
extracting transit duration data and transit location data, for both the first item and the second item, after cessation of operations at the third zone, based at least on reports regarding the first RFID tag code and the second RFID tag code received by the monitoring node;
a data analysis component configured to identify anomalous values indicated by the extracted storage duration data and the extracted transit duration data;
identifying anomalous values are indicated by the extracted storage duration data and the extracted transit duration data; and
the anomalous values comprise at least one value selected from the list consisting of: an excessive storage duration, an excessive transit duration, an improperly-routed transit, a misplaced item, and a missing item.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A multizone equipment tracking system comprising:
    a first radio frequency identification (RFID) tag configured to be affixed to a first item, the first item comprising inventoried equipment;
    a second RFID tag configured to be affixed to a second item, the second item different than the first item, the second item comprising inventoried equipment;
    a first RFID reader comprising a first communication module and deployed in a first zone, wherein the first RFID reader comprises a mobile reader and wherein the first zone comprises a transit zone;
    a second RFID reader comprising a second communication module and deployed in a second zone, wherein the second zone comprises a storage zone at an endpoint of the first zone, and wherein the second item is in a different zone than the first item; and a monitoring node;
    a third RFID reader comprising a third communication module and deployed in a third zone;
    wherein both the first RFID reader and the second RFID reader are configured to read both a first RFID tag code from the first RFID tag and a second RFID tag code from the second RFID tag;
    wherein both the first communication module and the second communication module are configured to report both the first RFID tag code and the second RFID tag code to the monitoring node;
    wherein the third zone comprises an operational zone in which the first item and the second item are employed as operating equipment;
    wherein the first zone comprises at least a portion of a transit route from the second zone to the third zone;
    wherein the third RFID reader is configured to read both the first RFID tag code from the first RFID tag and the second RFID tag code from the second RFID tag; and
    wherein the third communication module is configured to report both the first RFID tag code and the second RFID tag code to the monitoring node.

2. The multizone equipment tracking system of claim 1, wherein the first RFID tag comprises an optical barcode label, wherein the optical barcode label provides environmental protection for electrical components of the first RFID tag when the first RFID tag is affixed to the first item.

3. The multizone equipment tracking system of claim 1,
    wherein the first RFID reader further comprises a location sensor configured to determine a location of the first RFID reader; and
    wherein the first communication module comprises a wireless communication module configured to wirelessly report both a transit location of the first RFID tag and a transit location of the second RFID tag to the monitoring node.

4. The multizone equipment tracking system of claim 1, wherein the first RFID reader comprises a vehicle-mounted RFID reader.

5. The multizone equipment tracking system of claim 1 further comprising:
    a fourth RFID reader comprising a fourth communication module and deployed in a fourth zone, wherein the fourth zone comprises a storage zone at an endpoint of the first zone opposite the second zone;
    a fifth RFID reader comprising a fifth communication module and deployed in a fifth zone, wherein the fifth zone comprises a transit zone, and wherein the third zone and the fourth zones are at opposite endpoints of the fifth zone;
    wherein the fourth RFID reader and the fifth RFID reader are each configured to read both the first RFID tag code from the first RFID tag and the second RFID tag code from the second RFID tag; and
    wherein the fourth communication module and the fifth communication module are each configured to report both the first RFID tag code and the second RFID tag code to the monitoring node.

6. The multizone equipment tracking system of claim 1 further comprising:
    a data extraction component configured to extract storage duration data and transit duration data, for both the first item and the second item, from the second zone through the third zone, inclusive, based at least on reports regarding the first RFID tag code and the second RFID tag code received by the monitoring node.

7. The multizone equipment tracking system of claim 6, wherein the data extraction component is further configured to extract transit duration data and transit location data, for both the first item and the second item, after cessation of operations at the third zone, based at least on reports regarding the first RFID tag code and the second RFID tag code received by the monitoring node.

8. The multizone equipment tracking system of claim 6 further comprising:
    a data analysis component configured to identify anomalous values indicated by the extracted storage duration data and the extracted transit duration data, the anomalous values comprising at least one value selected from the list consisting of:
        an excessive storage duration, an excessive transit duration, an improperly-routed transit, a misplaced item, and a missing item.

9. A method of multizone equipment tracking, the method comprising:
    affixing a first radio frequency identification (RFID) tag to a first item, the first item comprising inventoried equipment;
    affixing a second RFID tag to a second item, the second item different than the first item, the second item comprising inventoried equipment;
    deploying a first RFID reader in a first zone, wherein the first RFID reader comprises a first communication module, wherein the first RFID reader comprises a mobile reader, and wherein the first zone comprises a transit zone;
    deploying a second RFID reader in a second zone, wherein the second RFID reader comprises a second communication module, wherein the second zone comprises a storage zone at an endpoint of the first zone, and wherein the second item is in a different zone than the first item;

deploying a third RFID reader in a third zone, wherein the third RFID reader comprises a third communication module;

reading, by the first RFID reader, both a first RFID tag code from the first RFID tag and a second RFID tag code from the second RFID tag;

reporting, by the first communication module, both the first RFID tag code and the second RFID tag code to a monitoring node;

reading, by the second RFID reader, both the first RFID tag code and the second RFID tag code;

reporting, by the second communication module, both the first RFID tag code and the second RFID tag code to the monitoring node;

wherein the third zone comprises an operational zone in which the first item and the second item are employed as operating equipment;

wherein the first zone comprises at least a portion of a transit route from the second zone to the third zone;

reading, by the first RFID reader, both the first RFID tag code from the first RFID tag and the second RFID tag code from the second RFID tag; and reporting, by the third communication module, both the first RFID tag code and the second RFID tag code to the monitoring node.

10. The method of claim 9, further comprising:
affixing an optical barcode label to the first item such that the optical barcode label provides environmental protection for electrical components of the first RFID tag.

11. The method of claim 9, further comprising:
determining a location of the first RFID reader; and
wirelessly reporting, by the first communication module, both a transit location of the first RFID tag and a transit location of the second RFID tag to the monitoring node.

12. The method of claim 9, further comprising:
deploying a fourth RFID reader in a fourth zone, wherein the fourth RFID reader comprises a fourth communication module, and wherein the fourth zone comprises a storage zone at an endpoint of the first zone opposite the second zone;

deploying a fifth RFID reader in a fifth zone, wherein the fifth RFID reader comprises a fifth communication module zone, wherein the fifth zone comprises a transit zone, and wherein the third zone and the fourth zones are at opposite endpoints of the fifth zone;

reading, by the fourth RFID reader, both the first RFID tag code from the first RFID tag and the second RFID tag code from the second RFID tag; and reporting, by the fourth communication module, both the first RFID tag code and the second RFID tag code to the monitoring node;

reading, by the fifth RFID reader, both the first RFID tag code from the first RFID tag and the second RFID tag code from the second RFID tag; and reporting, by the fifth communication module, both the first RFID tag code and the second RFID tag code to the monitoring node.

13. The method of claim 9, further comprising:
extracting storage duration data and transit duration data, for both the first item and the second item, based at least on reports regarding the first RFID tag code and the second RFID tag code received by the monitoring node.

14. The method of claim 13, further comprising:
identifying anomalous values indicated by the extracted storage duration data and the extracted transit duration data, the anomalous values comprising at least one value selected from the list consisting of:
an excessive storage duration, an excessive transit duration, an improperly-routed transit, a misplaced item, and a missing item.

15. A multizone equipment tracking system comprising:
a first radio frequency identification (RFID) tag configured to be affixed to a first item, the first item comprising inventoried equipment;
a second RFID tag configured to be affixed to a second item, the second item different than the first item, the second item comprising inventoried equipment;
a first RFID reader comprising a first communication module and deployed in a first zone, wherein the first RFID reader comprises a mobile reader, wherein the first RFID reader further comprises a location sensor configured to determine a location of the first RFID reader, and wherein the first zone comprises a transit zone;
a second RFID reader comprising a second communication module and deployed in a second zone, wherein the second zone comprises a storage zone at an endpoint of the first zone, and wherein the second item is in a different zone than the first item;
a third RFID reader comprising a third communication module and deployed in a third zone, wherein the third zone comprises an operational zone in which the first item and the second item are employed as operating equipment, and wherein the first zone comprises at least a portion of a transit route from the second zone to the third zone;
a monitoring node;
a data extraction component; and
a data analysis component;
wherein the first RFID reader, the second RFID reader, and the third RFID reader are each configured to read both a first RFID tag code from the first RFID tag and a second RFID tag code from the second RFID tag; and
wherein each of the first communication module, the second communication module, and the third communication module is configured to report both the first RFID tag code and the second RFID tag code to the monitoring node;
wherein the first communication module further comprises a wireless communication module configured to wirelessly report both a transit location of the first RFID tag and a transit location of the second RFID tag to the monitoring node;
wherein the data extraction component is configured to extract storage duration data and transit duration data, for both the first item and the second item, from the second zone through the third zone, inclusive, based at least on reports regarding the first RFID tag code and the second RFID tag code received by the monitoring node; and
wherein the data analysis component is configured to identify anomalous values indicated by the extracted storage duration data and the extracted transit duration data, the anomalous values comprising at least one value selected from the list consisting of:
an excessive storage duration, an excessive transit duration, an improperly-routed transit, a misplaced item, and a missing item.

16. The multizone equipment tracking system of claim 15, wherein the first RFID tag comprises an optical barcode label, wherein the optical barcode label provides environmental protection for electrical components of the first RFID tag when the first RFID tag is affixed to the first item.

17. The multizone equipment tracking system of claim 15, further comprising:
- a fourth RFID reader comprising a fourth communication module and deployed in a fourth zone, wherein the fourth zone comprises a storage zone at an endpoint of the first zone opposite the second zone; and
- a fifth RFID reader comprising a fifth communication module and deployed in a fifth zone, wherein the fifth zone compromises a transit zone, and wherein the third zone and the fourth zones are at opposite endpoints of the fifth zone,
- wherein the fourth RFID reader and the fifth RFID reader are each configured to read both the first RFID tag code from the first RFID tag and the second RFID tag code from the second RFID tag, and
- wherein the fourth communication module and the fifth communication module are each configured to report the first RFID tag code and the second RFID tag code to the monitoring node.

18. The multizone equipment tracking system of claim 15, wherein the data extraction component is further configured to extract transit duration data and transit location data, for both the first item and the second item, after cessation of operations at the third zone, based at least on reports regarding the first RFID tag code and the second RFID tag code received by the monitoring node.

* * * * *